United States Patent
Adelsperger et al.

(10) Patent No.: US 8,210,613 B2
(45) Date of Patent: Jul. 3, 2012

(54) SWIVEL SEAT WITH ADJUSTABLE SWIVEL RESISTANCE

(75) Inventors: Peter Adelsperger, Erding (DE); Christoph Babel, Munich (DE); Michael Hoiss, Poring (DE); James V. Kraimer, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 81 days.

(21) Appl. No.: 12/564,113

(22) Filed: Sep. 22, 2009

(65) Prior Publication Data
US 2010/0072801 A1    Mar. 25, 2010

Related U.S. Application Data

(60) Provisional application No. 61/098,928, filed on Sep. 22, 2008.

(51) Int. Cl.
A47C 1/00    (2006.01)
(52) U.S. Cl. ............................ 297/344.22; 297/344.21
(58) Field of Classification Search ............... 297/344.1, 297/344.21, 344.22
See application file for complete search history.

(56) References Cited

U.S. PATENT DOCUMENTS

| | | | | | |
|---|---|---|---|---|---|
| 2,671,631 | A | * | 3/1954 | Fox | 248/349.1 |
| 3,834,660 | A | * | 9/1974 | Leffler | 248/418 |
| 4,401,287 | A | | 8/1983 | Moeser | |
| 4,438,973 | A | * | 3/1984 | LaPointe | 297/344.22 |
| 4,655,632 | A | * | 4/1987 | Smith | 403/362 |
| 4,893,871 | A | * | 1/1990 | Kowalski | 297/270.1 |
| 5,082,328 | A | * | 1/1992 | Garelick | 297/344.1 |
| 5,882,076 | A | * | 3/1999 | Garelick et al. | 297/344.18 |
| 6,447,065 | B1 | * | 9/2002 | Ropp | 297/344.21 |
| 6,533,354 | B2 | * | 3/2003 | Ko | 297/344.21 |
| 6,575,420 | B2 | * | 6/2003 | Yoshida et al. | 248/425 |
| 6,938,957 | B2 | * | 9/2005 | Beatty et al. | 297/344.22 |
| 7,059,680 | B2 | * | 6/2006 | Billger et al. | 297/344.22 |
| 7,121,608 | B2 | | 10/2006 | Billger et al. | |
| 7,234,781 | B2 | * | 6/2007 | Liao | 297/461 |
| 7,520,567 | B2 | | 4/2009 | Billger et al. | |
| 2006/0061122 | A1 | | 3/2006 | Billger et al. | |

FOREIGN PATENT DOCUMENTS

EP    1260477 A1    11/2002
EP    1367474 A2    12/2003

OTHER PUBLICATIONS

Verheul, Omiros; International Search Report and Written Opinion of the International Searching Authority; International Application No. PCT/US2009/057755; Jan. 12, 2010; European Patent Office.

* cited by examiner

Primary Examiner — David Dunn
Assistant Examiner — Philip Gabler
(74) Attorney, Agent, or Firm — Stevens & Showalter LLP

(57) ABSTRACT

A swiveling seat comprises a seat bottom, a swivel mechanism and a swivel resistance system. The swivel mechanism allows the seat bottom to rotate at least partially around a first axis of rotation. The swivel resistance system may include a first member that rotates with the swivel mechanism, a second member that is fixedly positioned relative to the swiveling of the swivel mechanism and an operator adjustable resistance control that is operated by the vehicle operator to bias the second member into the first member so as to vary the resistance required to swivel the operator's seat.

19 Claims, 6 Drawing Sheets

SWIVEL SEAT WITH ADJUSTABLE SWIVEL RESISTANCE

APPLICATION INCORPORATED BY REFERENCE

This application claims the benefit of U.S. Provisional Application No. 61/098,928, filed Sep. 22, 2008 and entitled "SWIVEL SEAT WITH ADJUSTABLE SWIVEL RESISTANCE," the disclosure of which is incorporated by reference herein.

BACKGROUND OF THE INVENTION

The present invention relates in general to seats for materials handling vehicles, and more particularly, to systems and methods for integrating adjustable resistance features with swiveling seats for materials handling vehicles. The present invention further relates to swivel seats with adjustable resistance capabilities and materials handling vehicles having swiveling seats with adjustable resistance capabilities.

Materials handling vehicles typically include a platform, cab or other form of operator's compartment having an operator's seat and a number of control elements located in the vicinity of the seat within reach of the hands and/or feet of a corresponding vehicle operator. The control elements typically include steering and traction controls for navigating the vehicle and various switches and levers, which are provided for operating the load handling features of the vehicle.

In operation of a typical materials handling vehicle, situations may arise where the vehicle operator may wish to obtain different fields of view, such as when performing certain driving and/or load handling operations. As such, the operator's seat may rotate/swivel to reposition the operator within the operator's compartment. In this regard, the ability of the operator's seat to rotate may be limited, e.g., by the physical constraints of the operator's compartment, by the positioning of the control elements, and/or by the necessity of the operator to engage in different seated positions.

BRIEF SUMMARY OF THE INVENTION

According to aspects of the present invention, a swiveling seat for a materials handling vehicle comprises a seat bottom, a swivel mechanism and a swivel resistance system. The seat bottom provides a surface for an operator of the materials handling vehicle to sit. The swivel mechanism is coupled to the seat bottom so as to allow the seat bottom to rotate at least partially around a first axis of rotation relative to an operator's compartment of the materials handling vehicle. The first axis may be centrally located with respect to the operators seat, or may be non-centrally located so as to allow the seat to swivel in an arc. Conveniently, the seat is caused to rotate or swivel upon exertion of a force manually applied by an operator seated on the seat bottom. The swivel resistance system includes a first member coupled to the swivel mechanism so as to rotate with the swivel mechanism, for example, in response to the operator exerting a force to manually swivel the seat; and a second member that is fixedly positioned relative to the swiveling of the swivel mechanism. The first and second members are arranged to be engageable such that a variable force/resistance can be generated between the first and second members, which allows the resistance of the swivel mechanism can be adjusted. To this end, an operator adjustable resistance control may be provided. Suitably, the operator adjustable resistance control is positioned proximate to the operator's seat, and more suitably proximate to the seat bottom for ease of use by an operator seated on the seat. Thus, the adjustable resistance control may be operated by the vehicle operator on the fly to bias the second member to contact the first member in a manner that adjusts the force between the first member and the second member so as to vary the resistance required to swivel the operator's seat.

While in some embodiments any degree (angle) of rotation or swivel may be permitted (e.g. 360 degrees), in other embodiments, the swivel mechanism is arranged to limit the degree of allowable rotation or swivel. In this way, the amount of seat rotation can be controlled according to desirable characteristics and in view of geometry or physical constraints within the operator compartment. Accordingly, in any aspect or embodiment of the invention, the swiveling seat may include a first stop and a second stop that cooperate to limit the amount of rotation of the operator's seat, for example, in response to manually provided swivel force. The range of rotation of the operator's seat may, for example, be up to approximately 45 degrees in either direction from a default (e.g. central) position. Alternatively, the amount of rotation may be up to approximately 30 degrees from the default position. In a particularly suitable arrangement the rotation/swivel from the default (first) position towards a second position approximately 20 degrees towards the mast, and towards a third position approximately 10 degrees towards the vehicle exit, or anywhere in between. The amount of rotation may be controlled by a tracking assembly having a member defining detents biased to engagement with a movable element coupled to the seat wherein engagement of the movable element with the detents provides a tactile indication of one or more designated positions.

In some embodiments, the first member defines a first contact surface movable around the first axis of rotation; and the second member defines a second contact surface engageable with the first contact surface. Advantageously, the second member is supported on a pivot, which defines a second axis of rotation suitably spaced from the second contact surface, such that the second member is movable about the second axis of rotation to cause engagement of the second contact surface on the first contact surface with an adjustable force.

The swivel mechanism may be supported on a base structure of the seat. Conveniently, the adjustable resistance control may be arranged such that at least a portion extends through the base structure. In this way, the adjustable resistance control can be readily operated on the fly by a vehicle operator supported on the seat bottom.

Suitably, the adjustable resistance control comprises a plunger, lever or other member that is engageable with the second member or otherwise causes the second member to move relative to the first member thus changing the force being exerted against the first member and, hence, the resistance to movement of the first member. By way of example, the plunger may be movable towards and away from the second member, so as to adjust the resistance between the first and second members. In one beneficial arrangement, the adjustable resistance control comprises a rotatable knob configured such that rotation of the knob in a first direction causes a plunger to extend from the adjustable resistance control so as to cause the second member to pivot generally towards the first member thus increasing the force required to swivel the operator's seat, and rotation of the knob in a second direction opposite the first direction allows the second member to pivot generally away from the first member thus decreasing the force required to swivel the operator's seat.

The second member may be supported on a pivot and may comprise a first end portion, a second end portion and a second contact surface. In some embodiments, the pivot is arranged to define a second axis of rotation at a location proximate to a first end portion of the second member. Thus, a force applied distant to the pivot (e.g. at a position proximate to the second end portion) of the second member, for example, by way of the plunger of the adjustable resistance control, causes the second member to pivot towards the first member such that the second contact surface contacts the first contact surface of the first member. Beneficially, the second contact surface is located between the first end portion and the second end portion, and the force applied to the second member (e.g. by way of the plunger) at an opposite end of the second member from the first end portion causes the second member to pivot towards the first member bringing the second contact surface into engagement with the first contact surface. In such an arrangement, the first member may comprise an arm extending from the swivel mechanism that rotates with the swivel mechanism; and the second member may comprise a generally arcuate surface that extends generally around at least a portion of the perimeter of the swivel mechanism and contacts an end of the arm that extends from the swivel mechanism.

In an alternative embodiment, the adjustable resistance control is arranged to apply a force, for example by way of the plunger, at a location between the first end portion and a second end portion of the second member. In this embodiment it is convenient to locate the second contact surface proximate to the second end portion of the second member. In such an embodiment, the first member may suitably be located at an outside circumference of the swivel mechanism and be coupled to the swivel mechanism so as to rotate with the operator's seat; and the second member may comprise an arm having a generally cylindrical member at the end thereof, such that the arm can be biased by the adjustable resistance control to urge the generally cylindrical member against the first member to establish a desired swivel force of the operator's seat. The first member may include at least one indent that designates a predetermined rotated position into which the generally cylindrical member is configured to be received.

In yet another embodiment, the pivot defines the second axis of rotation at a location between a first end portion and a second end portion of the second member. In this embodiment, the adjustable resistance control is arranged to apply a force, for example by way of the plunger, at a location proximate to the first end portion of the second member; and the second contact surface may be located proximate to the second end portion. In this arrangement, the first member may comprise a disk on the swivel mechanism that rotates with the swivel mechanism; and the second member may comprise an engagement structure supported on the second end portion of the second member, the engagement structure having a surface that contacts a face of the disk.

It should be appreciated that any one or more features of the materials handling vehicle described elsewhere herein may be incorporated into any of the aspects and embodiments of the invention. As an example, the operator's seat may optionally include a locking device and corresponding seat release that allows the seat bottom to be selectively locked into an operator set position and unlocked for repositioning. Similarly, the operator's seat may comprise a control handle as described herein below for operating one or more vehicle controls/functions.

The invention also encompasses vehicles, such as materials handling vehicles, having a swiveling seat according to any aspect or embodiment of the invention.

It will be appreciated that any features described in relation to a particular aspect or embodiment of the invention may be incorporated into any other aspect or embodiment of the invention.

DETAILED DESCRIPTION OF THE INVENTION

In the following description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention. In particular, the features described with reference to a particular figure should not be considered as being limited only to that specific embodiment but may be incorporated into or exchanged with other features, unless otherwise stated.

According to various aspects of the present invention, an operator's seat for a materials handling vehicle includes a capability to rotate/swivel. Moreover, the vehicle operator has the ability to adjust the amount of rotation resistance exhibited by the operator's seat, e.g., "on the fly", so that the operator's seat can be configured to provide relatively less resistance, i.e., rotate more freely, or so that the operator's seat can be (re)configured to provide relatively more resistance, i.e., rotate less freely, in response to a force exerted on the operator's seat. For example, a vehicle operator may configure the operator's seat to a desired swivel resistance based upon factors such as operator strength, comfort and/or other anthropometrical considerations. In this regard, the swivel resistance of the operator's seat can be adjusted to accommodate, for example, the force manually exerted by the vehicle operator to rotate the operator's seat. The vehicle operator may also adjust the swivel resistance of the operator' seat to accommodate working conditions, such as to control induced torques during accelerations or on inclines, etc.

According to various aspects of the present invention, the vehicle operator can adjust the amount of rotation resistance of the operator's seat based upon factors such as comfort and/or performance, even while operating the corresponding materials handling vehicle. As such, the rotational resistance of the operator's seat may be adjusted in various dynamic situations, even as part of a work flow, e.g., while operating a moving materials handling vehicle such as a forklift truck. Moreover, according to various aspects of the present invention, the rotation resistance of the operator's seat may be adjusted by the operator without disturbing work operative positions. As such, the vehicle operator can dynamically alter the operator's seat swivel resistance depending upon context, e.g., the operating environment, task, etc.

Figure 1:
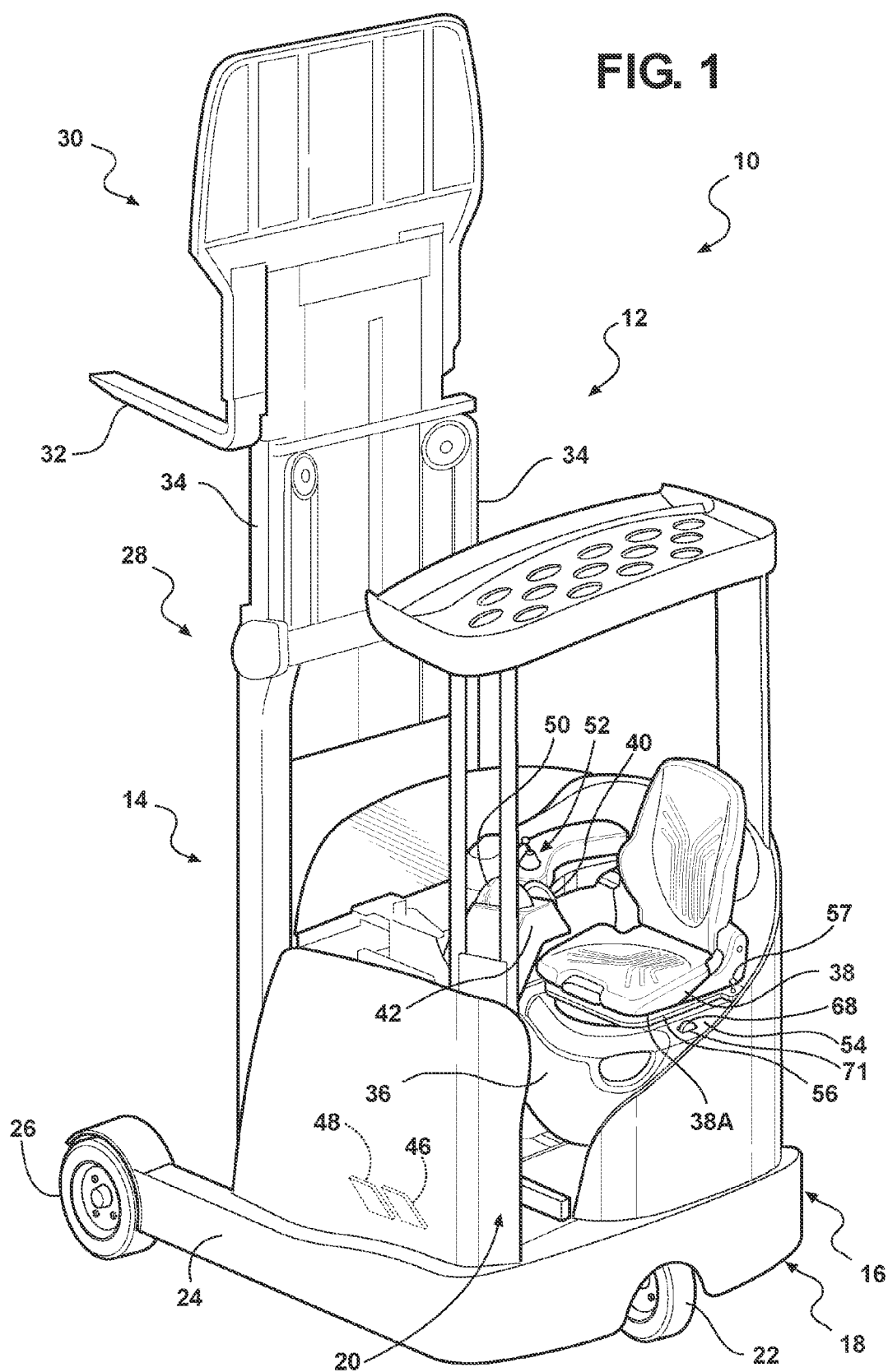
FIG. 1 is a schematic illustration of an exemplary materials handling vehicle according to aspects of the present invention.

Referring now to the drawings, and particularly to FIG. 1, an industrial vehicle 10, which is illustrated as a rider reach truck, includes a load handling assembly 12 positioned generally towards a front portion 14 of the vehicle 10 and a power unit 16 positioned generally towards a rear portion 18 of the vehicle 10. The power unit 16 includes an operator's compartment 20, a steered wheel 22 positioned generally beneath the operator's compartment 20, a pair of outriggers 24 that extend from the power unit 16 in a direction towards the front portion 14 of the vehicle 10 so as to flank either side of the load handling assembly 12 and a pair of front wheels 26, one wheel 26 coupled to each outrigger 24. The operator's compartment 20 has substantially open access thereto, e.g., via the opening from the rear portion 18 of the vehicle 10 as shown, which allows for unimpeded ingress and egress to the operator's compartment 20. However, the illustrated operator's compartment 20 is merely exemplary. In practice, the operator's compartment may be implemented in alternative configurations, e.g., based upon the style of materials handling vehicle. For example, a sit down forklift truck may have open access to the operator's compartment from the side of the vehicle, etc.

The load handling assembly 12 includes a mast 28 that extends generally vertically from the power unit 16, a fork carriage mechanism 30 supported by the mast 28 and a pair of forks 32 that are carried by the fork carriage mechanism 30. The illustrated mast 28 includes a pair of mast rails 34 defining an offset, wide view mast assembly.

However, depending upon the vehicle 10 and the intended applications, the load handling assembly 12 may be implemented by different mast 28 and fork arrangements or other load handling structures altogether.

The vehicle 10 further comprises a motor compartment 36, which may be located, for example, underneath and/or outside of the operator's compartment 20. The motor compartment 36 houses necessary motors and drive devices (not shown), such as a traction motor provided to drive the steered wheel 22, and one or more hydraulics motors, which are provided to power hydraulics functions of the vehicle 10. The various motors and drive devices may alternatively be positioned in separate compartments within or about the power unit 16.

The operator's compartment 20 defines an operator's station from which an operator may drive the vehicle 10 and control the load handling and other work operative features of the vehicle 10. The operator's compartment 20 includes in general, an operator's seat 38 and a plurality of work operative controls provided for navigating the vehicle 10, operating the work operative instruments of the vehicle 10 and performing other work related tasks. For example, as shown, the operator's compartment 20 includes a steering tiller 40 coupled to a steer column 42 for controlling the direction of travel of the vehicle 10.

Additionally, one or more presence sensing detectors may be provided about the operator's compartment 20. As shown, a first presence sensing detector is implemented as a left foot presence pedal 46 that is positioned about the floor of the operator's compartment 20 so as to generally lie under an operator's left foot, for example, when the operator's seat 38 is in a default position and the operator is in a work operative position seated in the operator's seat 38. The presence pedal 46 may be integrated with other vehicle electronics to limit, restrict, modify or otherwise enable certain vehicle work operations, depending upon whether the presence pedal 46 detects a foot of the vehicle operator. Adjacent to the presence pedal 46 is a control pedal 48, e.g., a brake pedal arrangement that may be operated by the right foot of the operator. Alternatively, an automotive style accelerator and brake pedal arrangement can be provided.

An operator interaction area may be provided, for example, on a control surface 50 of a first panel within the operator's compartment 20. The operator interaction area may include features such as an information display and/or one or more input/output (I/O) devices such as buttons, switches, knobs and levers, etc. Additionally, the operator interaction area may provide a location for mounting an optional data terminal, camera display or other work related devices. One or more control elements 52 may also be provided, e.g., coupled to an armrest of the operator's seat 38. The control elements 52 may collectively provide the functionality necessary to operate the vehicle 10 and its features, including controlling navigation and/or acceleration of the vehicle 10, operation of the working implements of the vehicle 10, e.g., by controlling the forks 32 and/or by operating other features related to the vehicle 10 or to the performance of specific tasks associated with the vehicle 10. For example, at least one of the control elements 52 may comprise a seat adjusting element that is associated with one or more of the adjustable features of the operator's seat 38. Other control elements 52 may sound a horn or other audible or visual signal, operate a communications link or provide any other desired functionality.

The exemplary control elements 52 may be combined into a control area, such as may be implemented by a multifunction control handle. For example, the exemplary control handle may include features such as a joystick, a thumb-operated control and a button or finger operated control element, etc. Such a control handle may enable the operator to perform several tasks from a single work operative position, without requiring large limb movements or excessive awkward adjustments of position. However, other devices may be positioned individually, or combined in one or more control areas elsewhere within or about the operator's compartment 20.

The operator's seat 38 may be positioned in the operator's compartment by components such as a base structure 54 and an optional intermediate member 56. The base structure 54 may be positioned, for example, above the motor compartment 36, and serves as a mounting structure for the operator's seat 38. The intermediate member 56 may be optionally provided, e.g., where the operator' seat 38 is adjustable in the fore/aft and/or lateral positions. The intermediate member 56 may also facilitate rotational capabilities of the operator's seat 38.

Still further, the operator's seat 38 may optionally include a locking device and corresponding seat release that allows a seat bottom 38A of the operator's seat 38 to be selectively locked into an operator set position relative to the base structure 54, and unlocked for repositioning. For, example, the operator's seat 38 may optionally include a locking bar 57 supported on the seat bottom 38A, or optionally on the intermediate member 56, for engagement with the base structure 54 between locked and unlocked positions. For example, the locking bar 57 may be positioned downwardly into engagement with the base structure 54 in a locked position, and the locking bar 57 may be positioned away from the base structure 54 in an unlocked position. In this regard, the particular seat arrangement and the corresponding adjustable feature or features will likely vary depending upon the vehicle 10 and the applications to be performed. Exemplary implementations of operator's seats and seat locking/release systems are set out in U.S. Pat. No. 7,059,680, entitled "Seat Repositioning Device with Release on Control handle", U.S. Pat. No. 7,121,608, entitled "Rotating and Swiveling Seat", and U.S. patent application Ser. No. 10/948,722, entitled "Systems And Methods For Seat Repositioning", each of which is incorporated by reference in its entirety, herein.

Figure 2:
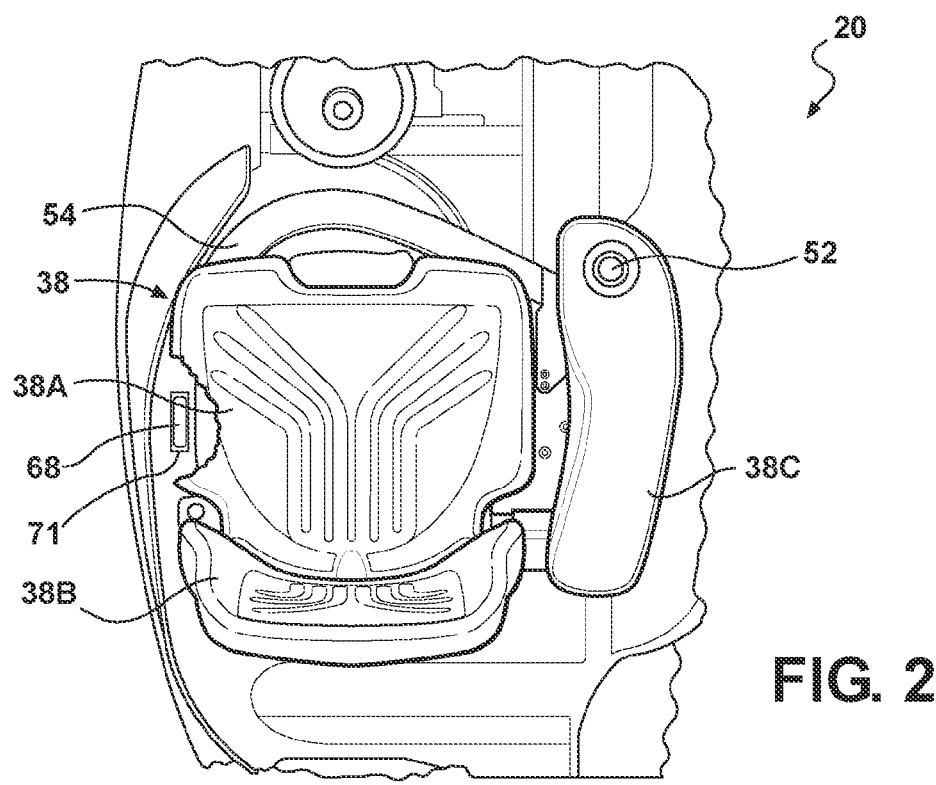
FIG. 2 is an illustration of an exemplary operator's seat in a first designated position according to various aspects of the present invention.
Figure 3:
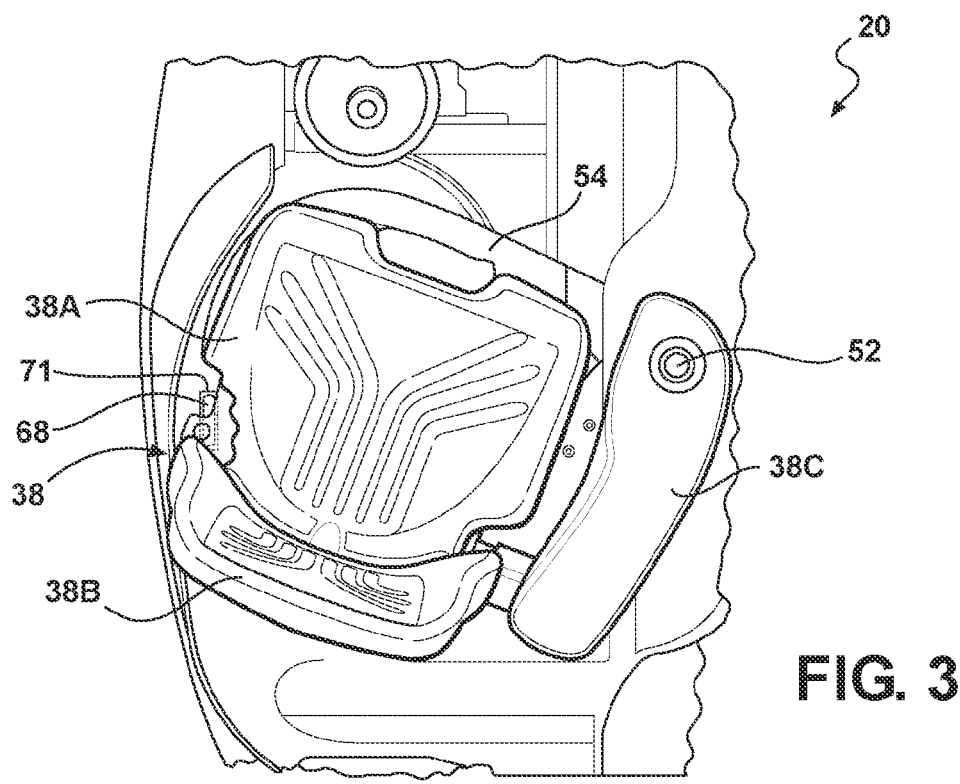
FIG. 3 is an illustration of an exemplary operator's seat in a second designated position according to various aspects of the present invention.
Figure 4:
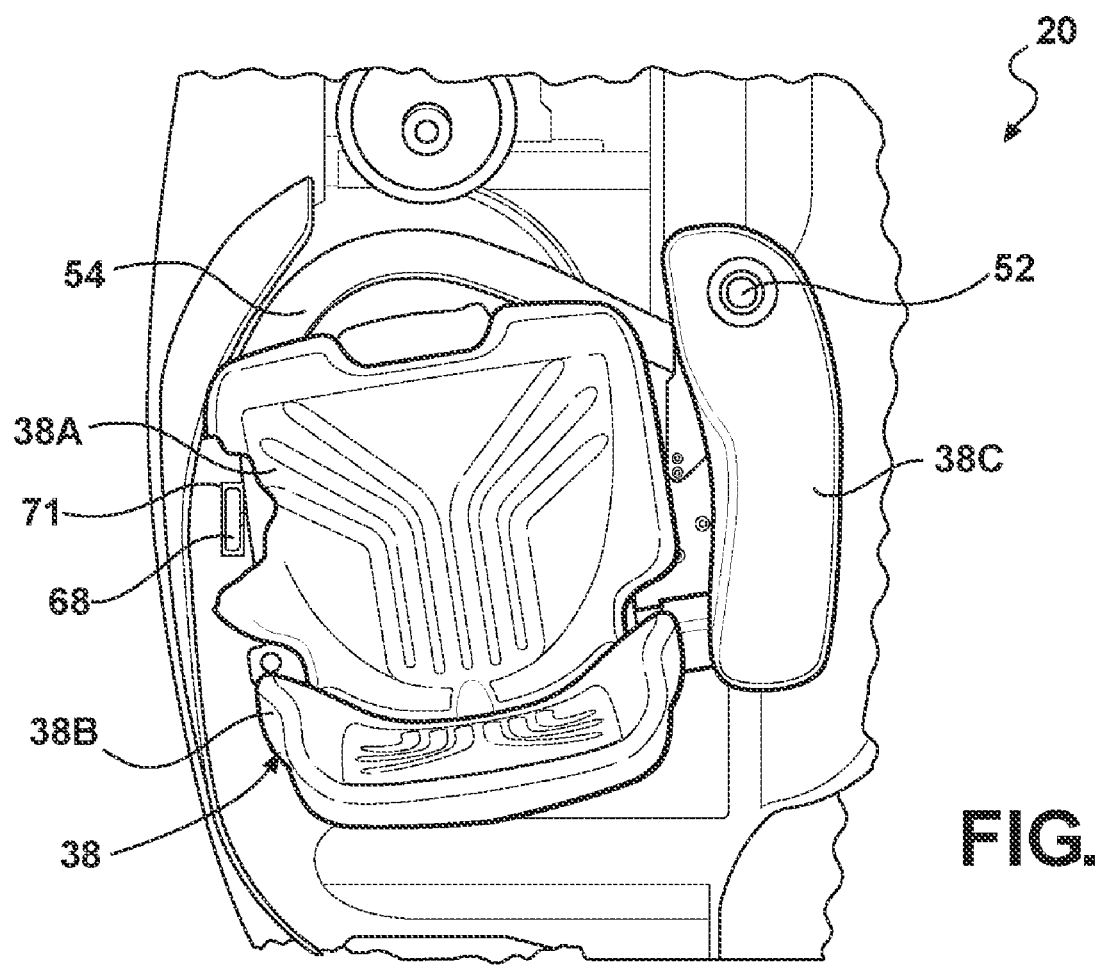
FIG. 4 is an illustration of an exemplary operator's seat in a third designated position according to various aspects of the present invention.

Referring to FIGS. 2-4 in general, the illustrated operator's seat 38 comprises a seat bottom 38A, a seat back 38B and an armrest 38C. By way of illustration and not by way of limitation, with reference to FIG. 2, the operator's seat 38 is illustrated in a first position, also designated a "zero position" or forward facing position herein. In the exemplary vehicle 10 of FIG. 1, the first position comprises a side facing position. With reference to FIG. 3, the operator's seat 38 is illustrated in a second position. In the current example, the second position may be defined by the operator's seat rotated towards the load handling assembly 12, e.g., by approximately 20 degrees relative to the first (zero) position. With reference to FIG. 4, the operator's seat is rotated into a third designated position. In the current example, the third position may be defined by the operator's seat rotated away from the load handling assembly 12, e.g., by rotating the operator's seat 10 degrees towards the vehicle exit relative to the first (zero) position. The first, second and third rotated positions are presented by way of illustration and not by way of limitation. Other ranges of rotation may be defined.

Figure 5:
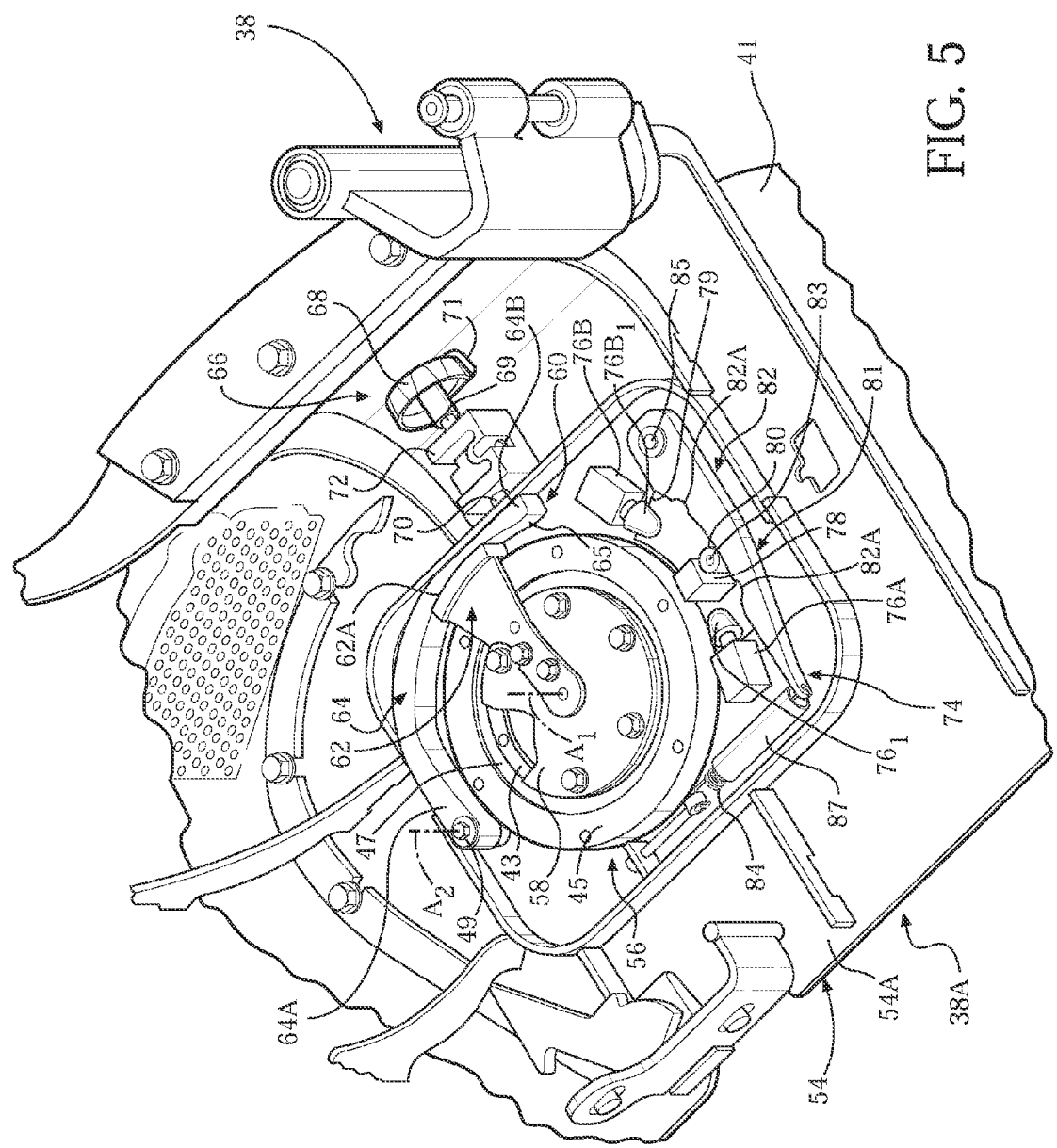
FIG. 5 is an illustration of a bottom view of an operator's seat illustrating various components including an operator adjustable swivel resistance feature according to various aspects of the present invention.

With reference to FIG. 5, the illustrative operator's seat 38 is viewed looking up from the underside of the seat bottom 38A. Moreover, certain components of the operator's seat 38 that are not relevant to the discussion herein have been removed to facilitate an explanation of the force adjusting and other capabilities according to various aspects of the present invention.

The seat bottom 38A of the operator's seat 38 provides a surface for an operator of the materials handling vehicle to sit. For example, the seat bottom 38A of the operator's seat 38 may include a seat base having an upper major surface and a lower major surface. The upper major surface of the seat base, which is located on the opposite side of the seat bottom 38A as illustrated, may support a seat cushion 41 or other suitable structure on upon which the vehicle operator may sit.

As noted in greater detail above, the illustrative operator's seat 38 is adjustable, e.g., the seat bottom 38A may be manually rotated by operator generated force, e.g., from a default, first position to a second position, e.g., approximately 20 degrees towards the mast, to a third position, e.g., 10 degrees towards the vehicle exit or anywhere in between. To facilitate this range of rotation, a swivel mechanism 56 may be coupled to the seat bottom 38A and support the seat bottom 38A to the base structure 54. The swivel mechanism 56 allows the seat bottom 38A to rotate at least partially around a first (predetermined) axis of rotation $A_1$ relative to the operator's compartment 20 of the materials handling vehicle 10 upon exertion of a force, such as may be manually applied by an operator seated on the operator's seat 38. In an exemplary arrangement, the swivel mechanism 56 comprises a disk 58 that is rigidly coupled to the seat base 39 via an inner journal 43 and is configured to rotate with the seat bottom 38A. An outer race 45 is coupled to a lower surface 54A of the base structure 54, and the inner journal 43 is rotatably supported within the outer race 45 by a bearing 47.

According to various aspects of the present invention, the swiveling capability of the operator's seat 38 is augmented with an adjustable resistance capability that allows the operator to manually adjust the resistance of the operator's seat 38 to manual seat repositioning. For example, the operator's seat 38 may further comprise a swivel resistance system 60. The swivel resistance system 60 includes in general, a first member 62, a second member 64 and an operator adjustable resistance control 66.

In the illustrative implementation, the first member 62 is coupled to a feature of the swivel mechanism 56 so as to rotate in response to rotation of the operator's seat 38. Correspondingly, the second member 64 is fixedly positioned relative to the swiveling feature of the swivel mechanism 56. The operator adjustable resistance control 66 is positioned on the lower surface 54A of the base structure 54, proximate to the seat bottom 38A, and is configured so as to be operated by the vehicle operator on the fly to bias the second member 64 to contact the first member 62 in a manner that adjusts the force between the first member 62 and the second member 64. Because the first member 62 rotates with the seat bottom 38A relative to the second member 64, the force between the first member 62 and the second member 64 correspondingly affects the resistance required to swivel the operator's seat 38.

In the illustrative example of FIG. 5, the first member 62 may be implemented as an arm having a bearing surface 62A, e.g., a generally arcuate end surface, which may comprise one or more layers of resistance promoting materials. The arm is fixedly attached to the swivel mechanism 56, e.g., via the disk 58, and extends generally outward in a radial direction from the disk 58, so that the generally arcuate bearing surface 62A follows the rotation of the disk 58.

In the illustrative example, the second member 64 may comprise a corresponding, generally elongate bearing surface 65 that extends generally around at least a portion of the perimeter of the swivel mechanism 56, i.e., around a portion of the outer race 45. For example, the second member 64 may be implemented as a resistance enabling lever having a first end portion 64A that is pivotally connected to the base structure 54 at a pivot point 49 and a second end portion 64B opposite the first end portion 64A. The elongate bearing surface 65 comprises an arcuate surface between the first and second end portions 64A, 64B. For example, the resistance enabling lever may be pinned at the first end portion 64A so as to be able to pivotally rotate about a second axis of rotation $A_2$ the pinned point 49. The resistance enabling lever comprising the second member 64 is spaced from and extends generally partially around the perimeter of the swivel mechanism 56 defined by the outer race 45. In this regard, the force required to swivel the seat 38 is determined, at least in part, based upon the frictional relationship of the first member 62, e.g., the bearing surface 62A of the arm, in frictional engagement with the generally elongate bearing surface 65 of the second member 64.

To facilitate "on the fly" adjustability of the swivel resistance of the operator's seat 38, the operator adjustable resistance control 66 urges the second member 64 into the first member 62 to achieve a desired amount of swivel resistance. According to aspects of the present invention, the operator adjustable resistance control 66 may comprise a rotatable knob 68 configured such that operator implemented rotation of the knob 68 in a first direction causes the plunger 70 to extend from a block member 72 of the operator adjustable resistance control 66. The plunger 70 is engaged or coupled to the second member 64 proximate to the second end portion 64B so as to cause the second member 64, e.g., proximate to the second end portion 64B, to pivot generally into the first member 62 thus increasing the force required to manually swivel the operator's seat 38. Correspondingly, operator implemented rotation of the knob 68 in a second direction opposite the first direction retracts the plunger 70 and thus reducing the force of the plunger 70 to urge the second member 64 against the first member 62, which may allow the second member 64 to pivot generally away from the first member 62 thus decreasing the force required to manually swivel the operator's seat 38, i.e., the operator's seat 38 can rotate more freely.

For example, as shown, the control knob 68 extends through an opening 71 (see FIG. 1) in the base structure 54 so that an operator can conveniently reach the knob 68 and turn it for setting the swivel seat resistance, even when in a seated position on the operator's seat 38. Moreover, the knob 68 can be adjusted dynamically, even while the operator is controlling one or more functions and/or driving/operating the corresponding materials handling vehicle 10.

The plunger 70 can be extended and retracted from the block member 72 of the operator adjustable resistance control 66 using any suitable technology, e.g., rotation of the knob 68 may turn a worm gear so as to enable a shuttle threaded onto the worm gear to traverse the worm gear longitudinally. The shuttle may define the plunger 70 or otherwise control the extension or retraction of the plunger 70 based upon operator control of the knob 68.

As noted with reference to FIGS. 2, 3 and 4, it may be desirable to limit the amount of rotation of the operator's seat to an amount less than 360 degrees. According to various aspects of the present invention, the base structure 54 and seat bottom 38A may further comprise a tracking assembly 74 to track and/or limit the rotation of the operator's seat 38. For example, the tracking assembly 74 may comprises a first stop 76A and/or a second stop 76B coupled to the base structure 54 that cooperate with a movable element coupled to the seat bottom 38A to limit the amount of rotation of the operator's seat 38 in response to swivel force, e.g., as may be manually provided by the vehicle operator to reposition the operator's seat 38. In the illustrative example, a block 78 may be rigidly coupled to the seat base 39 of the seat bottom 38A and extend through a slot 79 in the base structure 54. In particular, the block 78 is located adjacent to the outer circumference of the outer race 45 and rotates about the first axis of rotation with the seat bottom 38A. The first and second stops 76A, 76B flank the block 78. Each stop 76A, 76B may comprise a bumper $76A_1$, $76B_1$. Moreover, each bumper $76A_1$, $76B_1$ may be spring biased, e.g., via a spring loaded plunger that is coupled to a corresponding stop block, so as to absorb some of the impact of the operator's seat 38 as the seat bottom 38A rotates the block 78 into the respective stops 76A, 76B. Alternatively, other structures may be utilized to limit the rotational travel of the block 78 and further absorb the impact of the block 78 during engagement with the stops 76A, 76B.

According to various aspects of the present invention, the tracking assembly 74 includes a sensing arrangement 81 that senses, i.e., provides a tactile indication of, one or more designated positions. For example, the operator's seat 38 is defined with a plurality of designated operator positions, e.g., the zero position as described with reference to FIG. 2, the position 20 degrees toward the mast 28 as described with reference to FIG. 3, and the position 10 degrees towards the exit as described with reference to FIG. 4. To sense these designated positions, the sensing arrangement may comprise a roller 80 mounted adjacent to the block 78. For example, the roller 80 may be mounted to the seat bottom 38A by a pin 83. The roller 80 comprises a generally cylindrical component that contacts a finger 82 mounted to the base structure 54 and senses detents 82A in the finger 82. The finger 82 comprises a first end portion that is pivotally hinged, e.g., using a suitable fastening arrangement, at a pivot point 85 on the base structure 54. The finger 82 also includes a second end portion that is biased, e.g., by a spring 84, to rotate the finger 82 into the roller 80. The tension on the spring 84 may be determined such that a positive feedback, e.g., a tactile response, is provided to a vehicle operator manually swiveling the operator's seat 38 to designate one of the detent positions, e.g., one of the first, second or third positions in the illustrative examples herein. Further, the spring 84 may be surrounded with a sleeve 87, e.g., a sleeve formed from a rubber or similar material, for preventing contact between the spring 84 and the bottom 54A of the base structure 54 and thus prevent or limit potentially annoying sounds that may occur if the spring 84 were to rub or scrape against the base structure 54.

As such, as the operator's seat 38 is manually swiveled by an operator, the seat bottom 38A will rotate causing the tracking assembly 74 to correspondingly rotate. However, if the block 78 of the tracking assembly 74 strikes one of the end stops 76A, 76B, e.g., by striking a corresponding bumper $76A_1$, $76B_1$, the rotation of the operator's seat 38 will be halted. As such, a range of allowable rotation from a designated default, e.g., the first (zero) position can be defined to either side of the zero degree position. Moreover, the operator is presented with a tactile response due to the roller 80, the spring biased finger 82 and corresponding detents 82A along the finger 82.

Figure 6:
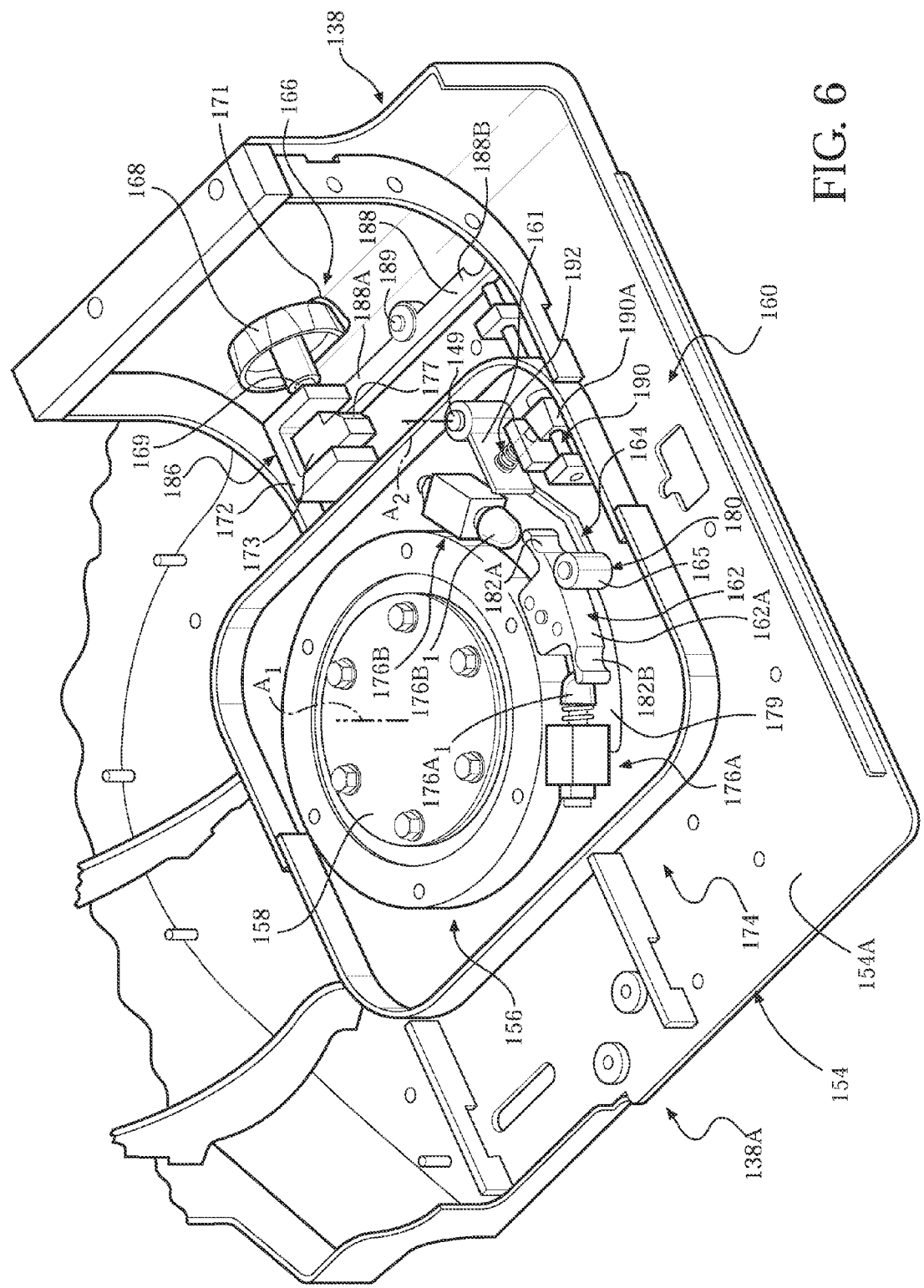
FIG. 6 is an illustration of a bottom view of an operator's seat illustrating various components including an operator adjustable swivel resistance feature according to further various aspects of the present invention.

Referring to FIG. 6, an alternative arrangement is provided to facilitate operator adjustable swivel seat resistance of a swivel resistance system 160 according to various aspects of the present invention wherein elements of the swivel resistance system 160 similar to those described for the swivel resistance system 60 in FIG. 5 are labeled with the same reference number increased by 100. The view of FIG. 6 is seen looking up from the underside of the seat bottom 138A. In the illustrative embodiment, a first member 162 is coupled to the swivel mechanism 156 so as to rotate with the operator's seat 138. The swivel mechanism 156 comprises substantially the same structure as that described for the swivel mechanism 56 in FIG. 5, and defines a first axis of rotation $A_1$ for the seat 238. In particular, the swivel mechanism includes an inner journal (not shown in FIG. 6) and outer race 145, a bearing (not shown in FIG. 6) and a disk 158 attached for rotation with the inner journal. The first member 162 may be implemented as a generally T-shaped block that is rigidly coupled to the seat bottom 138A and extends through a slot 179 in the base structure 154 adjacent to an outer circumference of the outer race 145 of the swivel mechanism 156. The first member 162 rotates with the seat bottom 138A around a first axis of rotation $A_1$.

A second member 164 comprises an elongated arm that is biased by the operator adjustable resistance control 166 to urge against the first member 162 to establish an operator desired swivel force of the operator's seat 138.

The adjustable resistance control 166 includes a knob 168 that extends through an opening 171 in the base structure 154 and is positioned for operator access, even while the operator is seated upon the seat bottom 138A of the operator's seat 138. The knob 168 can further be adjusted by the operator to manually determine the swivel resistance of the operator's seat 138 even during dynamic activities including operation of the corresponding materials handling vehicle 10. The knob 168 is coupled to structure 186 that is configured to adjust a first lever 188. As an illustrative example, the structure 186 may comprise a worm gear 169 or like structure coupled to the knob 168 that enables a shuttle 173 to traverse along the longitudinal shaft of the worm gear 169 within a range of travel limited by a generally U-shaped block 172. The shuttle 173 comprises an inclined plane 177 that receives a first end portion 188A of the first lever 188, also referred to herein as a first seesaw lever. The first lever 188 pivots about a fulcrum 189, e.g., a pin, positioned between its first and second end portions 188A, 188B so that rotational movement of the seesaw lever 188 causes corresponding linear translation of a first connecting rod 190 engaged with the second end portion 188B of the seesaw lever 188. The first connecting rod 190 includes a block 190A having an inclined surface that receives or engages a first end portion of a second connecting rod 192. As such, linear translation of the first connecting rod 190 causes corresponding linear translation of the second connecting rod 192 in a direction that is orthogonal to the linear translation of the first connecting rod 190. The second connecting rod 192 includes a second end portion that exerts a force upon a receiving surface 161 of the second member 164, which applies a force to the first member 162 to set the operator adjusted swivel resistance.

In particular, rotation of the knob 168 causes linear translation of the shuttle 173 of the structure 186 in a first direction. Because of the inclined plane 177 on the shuttle 173, linear translation of the shuttle 173 causes a corresponding rotational movement of the seesaw lever 188. Rotation of the seesaw lever 188 causes a linear movement of the first connecting rod 190, which causes a corresponding linear movement of the second connecting rod 192 in a direction that is orthogonal to that of the first connecting rod 190. The linear movement of the second connecting rod 192 causes the second member 164 to pivot about a fulcrum 149 defining a second axis of rotation $A_2$, thus urging an end portion 188 of the second member 164 against the first member 162. Specifically, the end portion 188 may comprise a generally cylindrical member having a bearing surface 165 that engages against the bearing surface 162A of the first member 162.

In the illustrative example of FIG. 6, a tracking assembly 174 is integrated with the swivel resistance system 160. The swivel seat 138 according to various aspects of the present invention may comprise one or more designated positions. Each designated position may be identified by implementing the first member 162 so as to include at least one indented area that designates a predetermined rotated position, illustrated herein by a pair on indent areas 182A, 182B. The indented area 182A, 182B is dimensioned so as to receive the generally cylindrical member 180 so as to provide a clear tactile indication to the operator that the designated position is reached.

Moreover, as illustrated, the first member 162 is flanked by stops 176A, 176B that limit the travel of the first member 162, and hence limit the rotation of the operator's seat 138. The stops 176A, 176B may be analogous to those described with reference to FIG. 5. For example, the stops 176A, 176B may each comprise a bumper $176A_1$, $176B_1$ for engagement with the first member 162. Moreover, each bumper $176A_1$, $176B_1$ may be spring biased, e.g., via a spring loaded plunger that is coupled to a corresponding stop block 176A, 176B, so as to absorb some of the impact of the operator's seat 138 as the seat bottom 138A rotates the first member 162 into a corresponding bumper $176A_1$, $176B_1$.

Figure 7:
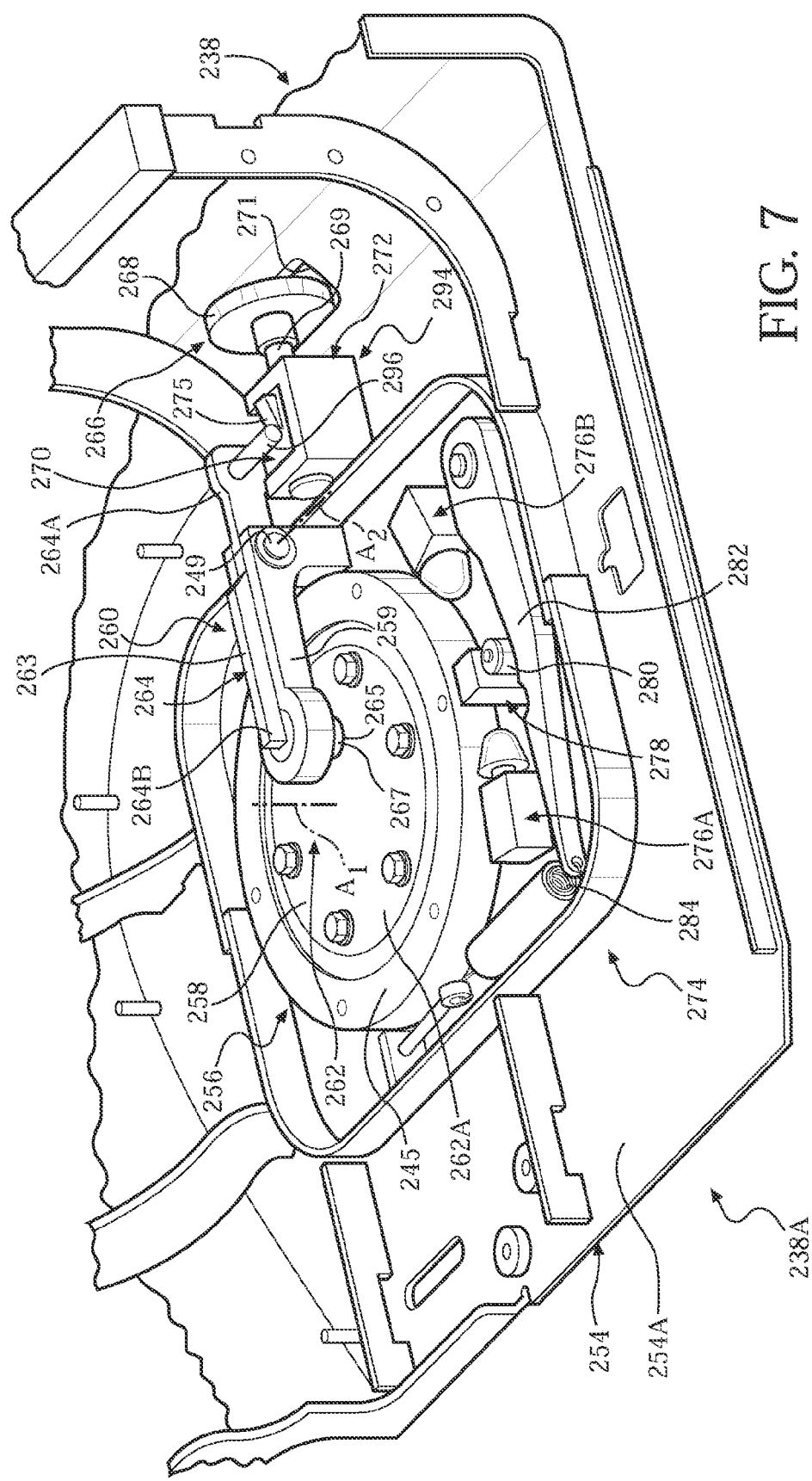
FIG. 7 is an illustration of a bottom view of an operator's seat illustrating various components including an operator adjustable swivel resistance feature according to still further various aspects of the present invention.

Referring to FIG. 7, an alternative arrangement is provided to facilitate operator adjustable swivel seat resistance of a swivel resistance system 260 according to still further aspects of the present invention wherein elements of the swivel resistance system 260 similar to those described for the swivel resistance system 60 in FIG. 5 are labeled with the same reference number increased by 200. Again, the view in FIG. 7 is seen looking up from underneath a seat bottom 238A. A swivel mechanism 256 coupled to the seat bottom 238A allows the seat bottom 238A to rotate at least partially around a first axis of rotation relative to an operator's compartment of the materials handling vehicle upon exertion of a force, e.g., which may be manually applied by an operator seated on the seat bottom 238A of the operator's seat 238. The swivel mechanism 256 is constructed in substantially the same manner as is described above for the swivel mechanism in FIG. 5, and defines a first axis of rotation $A_1$ for the seat 238. In particular, the swivel mechanism 256 includes an inner journal (not shown in FIG. 6) and outer race 245, a bearing (not shown in FIG. 6) and a disk 258 attached for rotation with the inner journal. The swivel resistance system 260 interacts with the swivel mechanism 256 to provide operator adjustable swivel resistance. The swivel resistance system 260 includes a first member 262, generally corresponding to the disk 258 of the swivel mechanism 256, and a second member 264 comprising an arm 263, pivotally supported at a fulcrum 249 for movement about a second rotational axis $A_2$. The second member 264 additionally comprises includes a generally cylindrical engagement member 267 having an engagement surface 265 that may be biased into an engagement surface 262A of the first member 262 defined by a first major surface of the disk 258.

An operator adjustable resistance control 266 is located on the base structure 254 proximate to the seat bottom 238A and is operated by the vehicle operator, e.g., on the fly, such that adjustment of the operator adjustable resistance control 266 causes the second member 264 to urge the engagement surface 265 of the second member 264 against the engagement surface 262A defined on the swivel mechanism 256 in a manner that adjusts the force between the second member 264 and the swivel mechanism 256 so as to vary the resistance to force required to swivel the operator's seat in response to an operator exerting a force to manually swivel the seat.

In particular, the arm 263 of the second member 264 may be implemented, for example, as a seesaw lever. The seesaw lever is supported in a stationary base support 259 defining the fulcrum 249 and includes a first end portion 264A proximate to the fulcrum 249 and a second end portion proximate to the engagement member 267. The base support may operate to position and/or guide the engagement member 267 in its engagement with the engagement surface 262A, and a second end portion 264B of the second member 264 may be hingedly, i.e., pivotally, engaged with the engagement member 267 at an end of the engagement member 267 opposite the engagement surface 265.

The operator adjustable resistance control 266 comprises a knob 268 that extends through an opening 271 in the base structure 254 and is positioned for operator access, as set out in greater detail herein. The knob 268 is coupled to a structure 294, e.g., a worm gear 269 supported by a generally "U" shaped block 272, and a shuttle 270 that is coupled to the worm gear 269. The shuttle 270 includes an inclined plane 275 that can be linearly traversed within the block 272 in response to manually turning the knob 268.

The first end portion 264A of the second member 264 includes a coupling member 296, e.g., a pin that extends from the first end portion 264A. The pin 296 engages or is received by the inclined plane 275 of the shuttle 272. Moreover, the fulcrum 249 between the first end portion 264A and the second end portion 262A enables the second member 264 to pivot and cause the engagement surface 265 of the engagement member 267 to engage the engagement surface 262A of the first member 262. In the illustrative example, rotation of the knob 268 causes linear translation of the shuttle 270. Linear movement of the shuttle 270 causes the pin 296 on the first end portion 264A of the second member 264 to ascend or descend the inclined plane 275 of the shuttle 270, thus rotating the second member 264 about its fulcrum 249. As the second member 264 is pivoted, the second member 264 causes the engagement member 267 to press against the engagement surface 262A defined on the disk 258 with a predetermined force. The greater the angle between the second member 264, i.e., the arm 263, and the engagement surface 262A defined on the disk 258, the greater the resistance to a swivel force.

The seat structure illustrated in FIG. 7 may also include a tracking system 274, e.g., substantially as described in greater detail herein, e.g., with reference to FIG. 5.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

With reference to the figures generally, because the acceleration or movement of the vehicle can effect the rotating position of a human-powered rotating seat, operators may want to adjust the level of rotation resistance according to their driving style, environment and/or context. For example, operators performing applications that require the vehicle to accelerate and stop quickly or applications that require the operators to frequently maneuver around certain objects in a 180° or 360° fashion, or perform frequent start/stop maneuvers may desire a relatively greater swivel seat resistance. Correspondingly, operators with slower driving patterns, e.g., requirement to drive slowly due to congestion in aisles or fragile goods on the pallet, may create an operator preference for a rotating seat that is very easy to turn, i.e., they may prefer less resistance.

In addition, some seats have an off center rotation axis. There is a torque generated by accelerations on the seat as a result of a longer moment arm. The amount of this torque is also affected by the size of the vehicle operator. However, according to various aspects of the present invention, the impact of these types of torques may be controlled and/or neutralized by setting the swivel resistance as set out in greater detail herein.

The adjustable resistance feature for seat rotation may also be utilized to accommodate physical differences among operators, e.g., between large and small operators, between relatively strong or less strong operators, etc. As an illustrative example, a vehicle operator may use their feet, legs and hips to manually rotate the operator's seat, i.e., turn a human-powered rotating seat. In this regard, the operators' body type and size can affect their ability to comfortably rotate the operator's seat. Also, depending on the type of materials handling vehicle, operators may be required to keep one or both feet on pedals or other operative controls while turning the seat during normal vehicle operation. Large operators typically have longer legs, which give them more leverage to rotate themselves left or right in the operator's seat. Therefore, from a physical strength standpoint, larger operators may prefer a seat that does not rotate too easily, i.e., they may prefer more resistance, e.g., relative to smaller operators.

The adjustable resistance feature also allows a vehicle operator to decide, even dynamically such as on the fly, whether a less restrained swivel or a more restrained swivel is desired. Thus, for example, a vehicle operator may want to control the rotation of the operator's seat depending on the dynamics of the vehicle, e.g., whether the vehicle is in a static state, moving, changing direction, etc. Still further, the environment, task at hand and other factors may affect the operator's setting of swivel seat resistance.

According to various aspects of the present invention, the operator adjustable swivel resistance control may allow a broad range of resistances. For example, the operator may adjust the swivel resistance to no (or virtually no) swivel resistance at all. In this arrangement, the operator's seat rotates freely. This provides the opportunity for the vehicle operator to manually perform relatively quick swivel movements. Alternatively, the operator may adjust the swivel resistance even to the point of effective braking of the rotating capabilities of the operator's seat. Thus, depending upon the task, environment, context, etc., the operator can adjust the operator's seat to not rotate, or to be difficult to rotate. For example, the operator may desire a relatively slow swiveling action. In this regard, the velocity at which the operator's seat rotates may depend upon both the friction that creates the swivel resistance as set out in greater detail herein, and the force applied to swivel the operator's seat. As such, a vehicle operator may set the swivel resistance of the operator's seat based upon a "force-resistance curve" according to operator preference, vehicle dynamics, desired swivel rate and/or other factors. Still further, the operator may adjust the swivel resistance to any alternative swivel resistance. For example, the swivel resistance may be infinitely variable between two resistance settings.

Vehicle operators are typically accustomed to using their legs to rotate themselves left or right. For these operators, a combination of various factors, such as body size, driving style/requirements and visibility requirements, may combine to create preferences, e.g., the right "feel" for them to operate their vehicles comfortably. The desired comfort is facilitated by the operator adjustable swivel resistance according to various aspects of the present invention.

For example, vehicle operators may prefer a certain degree of stiffness and smoothness in their seat movement, regardless of vehicle movement. Moreover, because operators typically rotate their seat in order to face the direction in which they want to see, the visibility requirements of a particular application may impact the frequency in which the operator's seat is rotated, and thus affecting the operator's perception of a desirable swivel resistance.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A swiveling seat for a materials handling vehicle comprising:
   a seat bottom;
   a swivel mechanism coupled to the seat bottom that allows the seat bottom to rotate at least partially around a first axis of rotation relative to an operator's compartment of the materials handling vehicle; and
   a swivel resistance system having:
      a first member coupled to the swivel mechanism so as to rotate with the swivel mechanism, the first member defining a first contact surface movable around the first axis of rotation;
      a second member that is fixedly positioned relative to the swiveling of the swivel mechanism, the second member defining a second contact surface movable to engage on the first contact surface;
      an operator adjustable resistance control to bias the second member to contact the first member in a manner that adjusts and sets the resistance between the first member and the second member so as to vary the force required to swivel the operator's seat, and wherein the resistance control includes an operator engageable component comprising a rotatable knob for setting and maintaining the resistance to a plurality of different resistance settings while continuously maintaining engagement of the second contact surface on the first contact surface, wherein the knob is adapted to be rotated to and remain at different rotational positions corresponding to different resistance settings; and
      the second member being supported on a pivot defining a second axis of rotation, the second member being movable about the second axis of rotation to engage the second contact surface on the first contact surface with an adjustable force.

2. The swiveling seat according to claim 1, wherein:
   the rotatable knob is configured such that rotation of the knob in a first direction causes a plunger to extend from the adjustable resistance control so as to cause the second member to pivot generally towards the first member thus increasing the force required to swivel the operator's seat, and rotation of the knob in a second direction opposite the first direction allows the second member to pivot generally away from the first member thus decreasing the force required to swivel the operator's seat.

3. The swiveling seat according to claim 1, wherein:
   the swivel mechanism is supported on a base structure; and
   a portion of the adjustable resistance control extends through a slot in the base structure for operation by a vehicle operator.

4. The swiveling seat according to claim 1, further comprising:
   a first stop and a second stop that cooperate with a movable element coupled to the seat bottom to limit the amount of rotation of the operators seat in response to manually provided swivel force.

5. The swiveling seat according to claim 4, including a tracking assembly having a member defining detents biased to engagement with the movable element wherein engagement of the movable element with the detents provides a tactile indication of one or more designated positions.

6. The swiveling seat according to claim 1, wherein the adjustable resistance control comprises a plunger engageable with the second member, and which is movable towards and away from the second member so as to adjust the resistance between the first and second members.

7. The swiveling seat according to claim 6, wherein:
   the pivot for the second member defines the second axis of rotation at a location proximate to a first end portion of the second member;
   the plunger causes a force to be applied proximate to a second end portion of the second member at an opposite end of the second member from the first end portion; and
   the second contact surface is located between the first end portion and the second end portion.

8. The swiveling seat according to claim 6, wherein:
   the pivot for the second member defines the second axis of rotation at a location proximate to a first end portion of the second member;
   the plunger causes a force to be applied at a location between the first end portion and a second end portion of the second member; and
   the second contact surface is located proximate to the second end portion.

9. The swiveling seat according to claim 6, wherein:
   the pivot for the second member defines the second axis of rotation at a location between a first end portion and a second end portion of the second member;
   the plunger causes a force to be applied at a location proximate to the first end portion of the second member; and
   the second contact surface is located proximate to the second end portion.

10. The swiveling seat according to claim 9, wherein:
    the first member comprises a disk on the swivel mechanism that rotates with the swivel mechanism; and
    the second member comprises an engagement structure supported on the second end portion of the second member, the engagement structure having a surface that contacts a face of the disk.

11. The swiveling seat according to claim 1, wherein:
    the first member comprises an arm extending from the swivel mechanism that rotates with the swivel mechanism; and
    the second contact surface of the second member comprises a generally arcuate surface that extends generally around at least a portion of the perimeter of the swivel mechanism and contacts an end of the arm that extends from the swivel mechanism.

12. The swiveling seat according to claim 1, wherein:
    the first member is located at an outside circumference of the swivel mechanism and is coupled to the swivel mechanism so as to rotate with the operator's seat; and
    the second member comprises an arm having a generally cylindrical member at the end thereof, the arm biased by the operator adjustable resistance control to urge the generally cylindrical member against the first member to establish an operator desired swivel force of the operators seat.

13. The swiveling seat according to claim 12, wherein:
    the first member includes at least one indent that designates a predetermined rotated position and the generally cylindrical member is configured to be received into each indent.

14. A materials handling vehicle having a base structure located in an operator's compartment and a swiveling seat supported on the base structure, the swiveling seat comprising:
    a seat bottom that provides a surface for supporting an operator of the materials handling vehicle in a sitting position;

a swivel mechanism coupled to the seat bottom that allows the seat bottom to rotate at least partially around a first axis of rotation relative to the base structure upon exertion of a force manually applied by an operator seated on the seat bottom; and a swivel resistance system having:

a first member coupled to the swivel mechanism so as to rotate with the swivel mechanism in response to the operator exerting a force to manually swivel the seat, the first member defining a first contact surface movable around the first axis of rotation;

a second member that is fixedly positioned relative to the swiveling of the swivel mechanism, the second member defining a second contact surface movable to engage on the first contact surface;

an operator adjustable resistance control, at least a portion of which extends through the base structure proximate to the seat bottom wherein the adjustable resistance control may be operated by the vehicle operator to bias the second member to contact the first member in a manner that adjusts and sets the resistance between the first member and the second member so as to vary the force required to swivel the operator's seat, and wherein the resistance control includes an operator engageable component comprising a rotatable knob for setting and maintaining the resistance to a plurality of different resistance settings while continuously maintaining engagement of the second contact surface on the first contact surface, wherein the knob is adapted to be rotated to and remain at different rotational positions corresponding to different resistance settings; and the second member being supported on a pivot defining a second axis of rotation, the second member being movable about the second axis of rotation to engage the second contact surface on the first contact surface with an adjustable force.

15. The materials handling vehicle according to claim 14, wherein the adjustable resistance control comprises a plunger engageable with the second member, and which is movable towards and away from the second member so as to adjust the resistance between the first and second members.

16. The materials handling vehicle according to claim 15, wherein:

the rotatable knob is configured such that rotation of the knob in a first direction causes the plunger to move so as to cause the second member to pivot generally into the first member thus increasing the force required to swivel the operator's seat, and rotation of the knob in a second direction opposite the first direction allows the second member to pivot generally away from the first member thus decreasing the force required to swivel the operator's seat.

17. The materials handling vehicle according to claim 14, further comprising:

a first stop and a second stop that cooperate with a movable element coupled to the seat bottom to limit the amount of rotation of the operator's seat in response to manually provided swivel force.

18. The materials handling vehicle according to claim 17, including a tracking assembly having a member defining detents biased to engagement with the movable element wherein engagement of the movable element with the detents provides a tactile indication of one or more designated positions.

19. A swiveling seat for a materials handling vehicle comprising:

a seat bottom;

a swivel mechanism coupled to the seat bottom that allows the seat bottom to rotate at least partially around a first axis of rotation relative to an operator's compartment of the materials handling vehicle; and a swivel resistance system having:

a first member coupled to the swivel mechanism so as to rotate with the swivel mechanism, the first member defining a first contact surface movable around the first axis of rotation;

a second member that is fixedly positioned relative to the swiveling of the swivel mechanism, the second member defining a second contact surface movable to engage on the first contact surface;

an operator adjustable resistance control to bias the second member to contact the first member in a manner that adjusts and sets the resistance between the first member and the second member so as to vary the force required to swivel the operator's seat, and wherein the resistance control sets and maintains the resistance to different resistance settings while continuously maintaining engagement of the second contact surface on the first contact surface; and the second member is supported on a pivot defining a second axis of rotation, the second member being movable about the second axis of rotation to engage the second contact surface on the first contact surface with an adjustable force.

* * * * *

UNITED STATES PATENT AND TRADEMARK OFFICE
CERTIFICATE OF CORRECTION

PATENT NO.        : 8,210,613 B2
APPLICATION NO.   : 12/564113
DATED             : July 3, 2012
INVENTOR(S)       : Peter Adelsperger et al.

It is certified that error appears in the above-identified patent and that said Letters Patent is hereby corrected as shown below:

In the Specifications:

Col. 1, lines 63-64, "which allows the resistance of the swivel mechanism can be adjusted." should read --which allows the resistance of the swivel mechanism to be adjusted--;

Col. 7, lines 50-51, "other suitable structure on upon which the vehicle operator may sit." should read --other suitable structure upon which the vehicle operator may sit.--;

Col. 12, lines 23-24, "The second member 264 additionally comprises includes a generally cylindrical engagement member" should read --The second member 264 additionally comprises a generally cylindrical engagement member--;

In the Claims:

Col. 16, lines 54-55, "an operator desired swivel force of the operators seat." should read --an operator desired swivel force of the operator's seat.--.

Signed and Sealed this
Seventh Day of May, 2013

Teresa Stanek Rea
*Acting Director of the United States Patent and Trademark Office*